US012497986B2

(12) United States Patent
Carlsson (10) Patent No.: US 12,497,986 B2
(45) Date of Patent: Dec. 16, 2025

(54) EXPANSION SLEEVE AND A CONNECTION DEVICE

(71) Applicant: Expander System Sweden AB, Åtvidaberg (SE)

(72) Inventor: Anders Carlsson, Åtvidaberg (SE)

(73) Assignee: Expander System Sweden AB, Åtvidaberg (SE)

(*) Notice: Subject to any disclaimer, the term of this patent is extended or adjusted under 35 U.S.C. 154(b) by 376 days.

(21) Appl. No.: 17/924,952

(22) PCT Filed: May 10, 2021

(86) PCT No.: PCT/SE2021/050442
§ 371 (c)(1),
(2) Date: Nov. 11, 2022

(87) PCT Pub. No.: WO2021/230794
PCT Pub. Date: Nov. 18, 2021

(65) Prior Publication Data
US 2023/0184279 A1     Jun. 15, 2023

(30) Foreign Application Priority Data
May 13, 2020   (SE) .................................. 2050565-7

(51) Int. Cl.
*F16B 19/02*     (2006.01)
*E02F 9/00*      (2006.01)
(Continued)

(52) U.S. Cl.
CPC .............. *F16B 19/02* (2013.01); *E02F 9/006* (2013.01); *F16C 11/045* (2013.01); *E02F 3/382* (2013.01);
(Continued)

(58) Field of Classification Search
CPC ....... F16B 2200/406; Y10T 403/32893; Y10T 403/32909; Y10T 403/7056; Y10T 403/7058; F16C 11/045
See application file for complete search history.

(56) References Cited

U.S. PATENT DOCUMENTS 3,600,015 A   8/1971  McMullen
4,634,299 A   1/1987  Svensson
(Continued)

FOREIGN PATENT DOCUMENTS

EP    3337988 B1   12/2019
FR    957526 A     2/1950
(Continued)

OTHER PUBLICATIONS

PCT International Search Report and Written Opinion, PCT/SE2021/050442, Jul. 21, 2021, 14 pages.

*Primary Examiner* — Michael P Ferguson
(74) *Attorney, Agent, or Firm* — Quarles & Brady LLP (57) ABSTRACT

An expansion sleeve for a connection device, the sleeve arranged on an axle of the connection device to secure the axle in a hole, the sleeve comprising: a first section with a first outer diameter; and a second section with a second outer diameter, the first section has a conical shape with a tapering inner wall configured to abut a tapered section of the axle, and an outer wall configured to abut an inner wall of the hole, the second section to axially abut a fastening device arranged at an end of the axle, the second outer diameter of the second section is smaller than the first outer diameter of the first section, and the second section comprises an inner wall extending with an angle relative the axial direction of the sleeve which is smaller than the angle of the tapering inner wall of the first section.

18 Claims, 6 Drawing Sheets

(51) Int. Cl.
*F16C 11/04* (2006.01)
*E02F 3/38* (2006.01)

(52) U.S. Cl.
CPC ...... *F16C 2226/16* (2013.01); *F16C 2326/20* (2013.01); *Y10T 403/32909* (2015.01); *Y10T 403/7058* (2015.01)

(56) References Cited

U.S. PATENT DOCUMENTS

| | | | | |
|---|---|---|---|---|
| 4,652,167 | A | * | 3/1987 | Garman ................ F16C 11/045 403/162 |
| 5,190,393 | A | | 3/1993 | Svensson |
| 5,209,594 | A | * | 5/1993 | Svensson ................ F16C 11/02 403/150 |
| 5,474,403 | A | * | 12/1995 | Hetrich ................... F16D 1/094 403/370 |
| 7,192,213 | B2 | * | 3/2007 | Mermoz ................ F16C 3/023 403/1 |
| 7,837,407 | B2 | * | 11/2010 | Sellers ................... B62D 7/166 403/368 |
| 2005/0141954 | A1 | | 6/2005 | Mieger et al. |

FOREIGN PATENT DOCUMENTS

| | | |
|---|---|---|
| WO | 8502236 A1 | 5/1985 |
| WO | 2011065837 A1 | 6/2011 |

* cited by examiner

EXPANSION SLEEVE AND A CONNECTION DEVICE

CROSS-REFERENCE TO RELATED APPLICATIONS

This application represents the U.S. national stage entry of International Application No. PCT/SE2021/050442 filed May 10, 2021, which claims priority to Swedish Patent Application No. 2050565-7 filed May 13, 2020, the disclosures of which are incorporated herein by reference in their entirety and for all purposes.

TECHNICAL FIELD

The present invention relates to an expansion sleeve for a connection device. The invention also relates to a connection device comprising such an expansion sleeve and a vehicle comprising such a connection device.

BACKGROUND

There are many different ways of achieving connection between two machine parts or components. For pivotal connection, typically a hinge journalled in bearings is used, where one or more bearings are arranged on an axle, which is fixed in holes in a pair of pivot lugs on one of the machine parts and wherein the bearings are connected to the second machine part. With such arrangement, the relative movement between the bearings and the axle will eventually lead to wear, which results in excessive play also between the axle and the pivot lugs. This may damage the axle, which could have serious consequences. The overcome these problems, expansion sleeves arranged between the axle and the pivot lugs may be used. When tightening fastening elements at the ends of the axle, the expansion sleeves will expand and apply a clamping force on the inner walls of the pivot lugs. This way, the axle is secured in the pivot lugs.

SUMMARY

Despite known solutions in the field, it would be desirable to develop an expansion sleeve and a connection device, which overcomes or alleviates at least some of the drawbacks of the prior art.

An object of the present invention is thus to achieve an advantageous expansion sleeve, which results in an increased clamping force against the hole in which an axle is to be secured. Another object of the present invention is to achieve an advantageous expansion sleeve, which is more cost-efficient. Furthermore, an object of the present invention is to achieve a connection device, which is robust, user-friendly and cost-efficient.

The herein mentioned objects are achieved by an expansion sleeve, a connection device comprising such an expansion sleeve, and a vehicle comprising such a connection device according to the independent claims.

Hence, according to an aspect of the present invention, an expansion sleeve for a connection device is provided, the expansion sleeve being configured to be arranged on an axle of the connection device to secure the axle in a hole, the expansion sleeve comprising: a first section with a first outer diameter; and a second section with a second outer diameter, wherein the first section has a conical shape with a tapering inner wall configured to abut a tapered section of the axle, and an outer wall configured to abut an inner wall of the hole, the second section being configured to axially abut a fastening device arranged at an end of the axle, wherein the second outer diameter of the second section is smaller than the first outer diameter of the first section, and wherein the second section comprises an inner wall extending with an angle relative the axial direction of the expansion sleeve, which is smaller than the angle of the tapering inner wall of the first section.

According to another aspect of the invention, a connection device for connecting two components is provided, the connection device comprising: an axle; at least one fastening device arranged in connection with the axle; and at least one expansion sleeve as disclosed herein, wherein the axle comprises at least one tapered section and is configured to be arranged with the at least one tapered section in a hole, wherein the at least one expansion sleeve is arranged over the tapered section, the at least one fastening device pressing axially against the expansion sleeve, such that the first section of the expansion sleeve expands and the outer wall of the first section presses against the inner wall of the hole.

According to yet another aspect of the present invention, a vehicle is provided, the vehicle comprising a connection device as disclosed herein to connect two components.

By using an expansion sleeve according to the present invention, the risk for the expansion sleeve getting stuck on the outer edge of the hole is reduced. The hole may be a borehole or a hole of a pivot lug. When tightening the fastening device, the expansion sleeve is pushed axially over the tapered section of the axle, and the first section of the expansion sleeve will expand. The outer wall of the first section will this way press against the inner wall of the hole and thereby apply a clamping force. Commonly known expansion sleeves typically comprises a single conical unit with a homogenous outer diameter. When such commonly known expansion sleeves are pushed axially, the outer wall of the expansion sleeve may inconveniently abut the outer edge of the hole and thereby affect the expansion of the expansion sleeve. With the second outer diameter being smaller than the first outer diameter according to the invention, the outer wall of the second section will not interact with the hole and will thereby not affect the expansion of the first section. This way, mounting the expansion sleeve and the connection device is facilitated and an increased clamping force may be applied by the expanding first section.

Furthermore, with the second section having an inner wall extending with a smaller angle relative the axial direction of the sleeve compared to the tapering inner wall of the first section, the risk for the expansion sleeve getting stuck on the axle is reduced. When a commonly known expansion sleeve is pushed axially, the inner wall of the expansion sleeve may abut the tapered section of the axle and prevent further axial movement. The expansion of the expansion sleeve may thereby be negatively affected. With a second section according to the invention, the second section will not interfere with the tapered section of the axle, and an improved expansion of the expansion sleeve may be achieved. Also, with a second section according to the invention, the second section will have a larger inner diameter compared to a commonly known expansion sleeve. With a larger inner diameter, the axle can have end sections with a larger diameter. Since the expansion sleeve is mounted axially over the end sections of the axle, the smallest inner diameter of the expansion sleeve will determine the maximum diameter of the end sections of the axel. With larger end sections of the axle, also the fastening device can be larger and thereby provide a larger force on the expansion sleeve. The expansion of the first section will thereby be improved and the clamping force applied by the expansion sleeve will thereby be increased. A larger inner diameter will also make the expansion sleeve easier to manufacture and thereby more cost-efficient. Also, with an expansion sleeve according to the invention, the force applied by the fastening device will be applied centrally on the contact surface of the expansion sleeve, which will reduce the risk of the expansion sleeve being deformed or bent around the axle.

Further objects, advantages and novel features of the present invention will become apparent to one skilled in the art from the following details, and also by putting the invention into practice. Whereas the invention is described below, it should be noted that it is not restricted to the specific details described. Specialists having access to the teachings herein will recognise further applications, modifications and incorporations within other fields, which are within the scope of the invention.

BRIEF DESCRIPTION OF THE DRAWINGS

For fuller understanding of the present disclosure and further objects and advantages of it, the detailed description set out below should be read together with the accompanying drawings, in which the same reference notations denote similar items in the various drawings, and in which.

DETAILED DESCRIPTION

To achieve an improved, robust and cost-efficient connection between two components or machine parts, an expansion sleeve and a connection device according to the present disclosure has been developed. The present disclosure is applicable on all sorts of components being connected. The present disclosure is applicable on all bolt/pin/axle connections for fixating or aligning components, both pivotal connections and rigid connections. The disclosure is applicable on vehicles, such as construction vehicles, mining vehicle, forestry vehicles or similar.

Hence, according to an aspect of the present disclosure, an expansion sleeve for a connection device is provided. The expansion sleeve is configured to be arranged on an axle of the connection device to secure the axle in a hole. The expansion sleeve comprises: a first section with a first outer diameter; and a second section with a second outer diameter, wherein the first section has a conical shape with a tapering inner wall configured to abut a tapered section of the axle, and an outer wall configured to abut an inner wall of the hole, the second section being configured to axially abut a fastening device arranged at an end of the axle, wherein the second outer diameter of the second section is smaller than the first outer diameter of the first section, and wherein the second section comprises an inner wall extending with an angle relative the axial direction of the expansion sleeve which is smaller than the angle of the tapering inner wall of the first section.

The expansion sleeve as disclosed herein may be used in any connection device, such as a pivot pin assembly or a rigid bolt connection. The hole in which the axle is to be secured by means of the expansion sleeve may be a borehole in a component or a hole of a pivot lug. The expansion sleeve may thus be configured to be arranged on an axle of the connection device to secure the axle in a pivot lug. The expansion sleeve as disclosed herein may be specifically suitable for use in "first fit" pivot pin assemblies. Thus, the expansion sleeve may be specifically suitable in pivot pin assemblies in applications where there has not been any wear yet, and thus where there is no play between the axle and the pivot lug. As an example, the expansion sleeve may be suitable to be used during manufacturing of a vehicle comprising components to be pivotally connected with each other. The expansion sleeve may also be used in a bolt connection for rigidly connecting two components.

The expansion sleeve will herein be referred to as the sleeve. The sleeve is configured to be coaxially arranged on the axle with the first section of the sleeve aligned with the tapered section of the axle and the hole, and the second section aligned with an end section of the axle outside the hole. The inner wall of the second section extending with a smaller angle relative the axial direction of the sleeve than the angle of the tapering inner wall of the first section means that there may be a gap between the second section of the sleeve and the axle. More specifically, there may be a gap between the second section of the sleeve and the end section of the axle. The axial direction is the direction of the axial extension of the sleeve. The sleeve may extend axially between a first end/first opening at the first section and a second end/second opening at the second section. The axial extension of the sleeve may be referred to as the longitudinal extension of the sleeve or the length of the sleeve. The axial extension/length of the first section and the axial extension/length of the second section in combination thus defines the total axial extension/length of the sleeve. The fastening device is configured to be arranged coaxially on the axle and thus surround the axle. The fastening device should thus be arranged, such that it abuts the second end of the expansion sleeve.

The sleeve may comprise at least one cut/slot enabling the expansion of the sleeve. The at least one cut/slot may extend axially along the length of the first section. The at least one cut/slot may further extend along the length of the second section.

The second outer diameter of the second section may be between 0.5-5 millimetres smaller than the first outer diameter of the first section. The second outer diameter of the second section being smaller than the first outer diameter of the first section may also be referred to as the sleeve having a stepped outer diameter.

The first section having a tapering inner wall means that the first section comprises a first inner diameter, which varies along the axial extension of the first section. The tapering inner wall of the first section may be tapering in direction from the second section towards the first end of the sleeve. Thus, the first inner diameter of the first section may increase in direction towards the first end/first opening and decrease in direction towards the second section of the sleeve. The tapering inner wall of the first section may extend with a first angle in relation to the axial direction. The inner wall of the second section may extend with a second angle in relation to the axial direction. The second angle is thus smaller than the first angle of the first section. The second angle may be between 1-15 degrees smaller than the first angle.

According to an example of the present disclosure, the second section has a cylindrical shape. The second section may thus have an essentially homogenous/constant second outer diameter and an essentially homogenous/constant second inner diameter. In this example, the inner wall of the second section extends with an angle of zero/180 degrees in relation to the axial direction. The inner wall of the second section thus extends in parallel with the axial direction. With an essentially cylindrically shaped second section, manufacturing is easier and more cost-efficient.

According to another example, the second section has a conical shape. Thus, the second section may comprise an inner wall, which extends with an angle different from 0 or 180 degrees. The second section may thus have a second inner diameter, which varies along the length of the second section. The second section may be conical, such that the second inner diameter decreases in direction towards the second end/second opening of the sleeve. Alternatively, the second section is conical, such that the second inner diameter increases in direction towards the second end/second opening of the sleeve. In another example, the second section is conical by comprising a tapering outer wall.

In one example, the outer wall of the first section has a length similar to, or shorter than, a width of the hole. Thus, the outer wall of the first section may have the same length as the inner wall of the hole, or the outer wall of the first section may be shorter than the inner wall of the hole. The length of the outer wall of the first section may define the length of the first section. The outer wall of the first section may have a chamfered section in the transition between the first section and the second section. It is to be understood that where the outer wall of the first section ends, the outer wall of the second section starts. By configuring the first section, such that the outer wall of the first section is shorter or equally long as the hole, it is ensured that the first section does not interact with the outer edge of the hole and thereby affects the expansion of the first section during mounting of the sleeve.

According to another example, the tapering inner wall of the first section has a length similar to, or shorter than, a length of the tapered section of the axle. The tapering inner wall of the may thus have the same length as the tapered section of the axle or be shorter than the tapered section of the axle. It is to be understood that where the tapering inner wall of the first section ends, the inner wall of the second section starts. By configuring the first section, such that the tapering inner wall of the first section is shorter or equally long as the tapered section of the axle, it is ensured that the first section does not interact with the outer edge of the tapered section of the axle and thereby affects the expansion of the first section during mounting of the sleeve.

According to an example of the present disclosure, the second section comprises outer threads. Thus, the outer wall of the second section may comprise threads. The threads may be used for removing the sleeve from the connection device and thereby facilitate removal of the sleeve. The sleeve may thus have integrated threads.

According to another aspect of the present disclosure, a connection device for connecting two components is provided. The connection device comprises: an axle; at least one fastening device arranged in connection with the axle; and at least one expansion sleeve as disclosed herein; wherein the axle comprises at least one tapered section and is arranged with the at least one tapered section in a hole, wherein the at least one expansion sleeve is arranged over the tapered section, the at least one fastening device pressing axially against the expansion sleeve, such that the first section of the expansion sleeve expands and the outer wall of the first section presses against the inner wall of the hole.

In one example, the axle comprises a first end section and a second end section and the connection device further comprises two fastening devices, one fastening device arranged over each end section of the axle, wherein the axle further comprises a centre section and the at least one tapered section is tapering from the centre section towards the first end section or the second end section.

According to another aspect of the present disclosure, a connection device for connecting two components is provided. The connection device comprises: an axle with a first end section and a second end section; two fastening devices, one fastening device arranged over each end section of the axle; and at least one expansion sleeve as disclosed herein, wherein the axle comprises a centre section, a first tapered section tapering from the centre section towards the first end section, and a second tapered section tapering from the centre section towards the second end section, wherein the axle is configured to be arranged with the tapered sections in a pair of holes, wherein the at least one expansion sleeve is arranged over a tapered section, a fastening device pressing axially against the expansion sleeve, such that the first section of the expansion sleeve expands and the outer wall of the first section presses against the inner wall of the hole. The pair of holes form part of one of the components to be connected to each other by means of the connection device. The second component may be connected to the centre section of the axle of the connection device.

The connection device may comprise two expansion sleeves, one arranged at each tapered section of the axle.

The first end section and the second end section of the axle may each have a diameter, which is smaller than the diameter of the tapered sections and the centre section of the axle. Typically, the diameter of the end sections is smaller than the smallest inner diameter of the expansion sleeve, such that the expansion sleeve can be passed/inserted axially over the end section to the correct position surrounding the tapered section of the axle. The tapered sections of the axle may have an axial extension similar to the width of the holes. The length (axial extension) of the centre section of the axle may thus correspond to the distance between the two holes.

According to an example, the fastening device comprises a nut and/or a washer. Alternatively, the fastening device comprises a bolt. The fastening device may comprise only a nut, wherein the nut is arranged surrounding an end section of the axle. The nut will in such case abut the second end of the expansion sleeve and push the expansion sleeve axially over the tapered section of the axle.

Alternatively, the fastening device may comprise a nut and a washer. In such case, the washer and the nut are arranged surrounding an end section of the axle, such that the washer abuts the second end of the expansion sleeve. The nut will thereby be arranged outwardly of the washer. Using both a washer and a nut may be advantageous when using a larger axle/connection device. In another example, the fastening device may form part or be integrated with the component comprising the hole(s) in which the axle is to be secured.

In one example, the connection device further comprises at least one sealing arranged at an end section of the axle, wherein the at least one sealing is arranged around the second section of the expansion sleeve. The sealing thus surrounds the second section of the sleeve. This way, a groove for the sealing will be formed between the fastening device and the hole. More specifically, a groove for the sealing will be formed between the fastening device and the component comprising the hole, such as a pivot lug. Positioning of the sealing will thereby be facilitated. The sealing will this way be clamped between a fastening device and a component with a hole. The sealing may have a thickness, which corresponds to the length of the second section of the expansion sleeve. Thus, the length of the second section of the sleeve may be adapted to fit a sealing. The sealing may have a thickness, which corresponds to the distance between the holes and the respective fastening device. The sealing may be a conventional sealing. The sealing will make sure that external dirt/contaminations/pollution do not enter between the hole, the expansion sleeve and the axle. The connection device may comprise two sealings, one arranged at each end section of the axle. The connection device may comprise two expansion sleeves and two sealings. Thus, the connection device may comprise a sealing arranged around the second section of each expansion sleeve.

The connection device may be a pivot pin assembly for pivotally connecting two components. The connection device may alternatively be a bolt connection for rigidly connecting two components.

According to another aspect of the present disclosure, a vehicle is provided. The vehicle comprises a connection device as disclosed herein, to connect two components of the vehicle. The vehicle may be any vehicle. Specifically, the vehicle may be a construction vehicle, a mining vehicle, a forestry vehicle or similar.

The present disclosure will now be further illustrated with reference to the appended figures.

Figures 1A, 1B, 2:
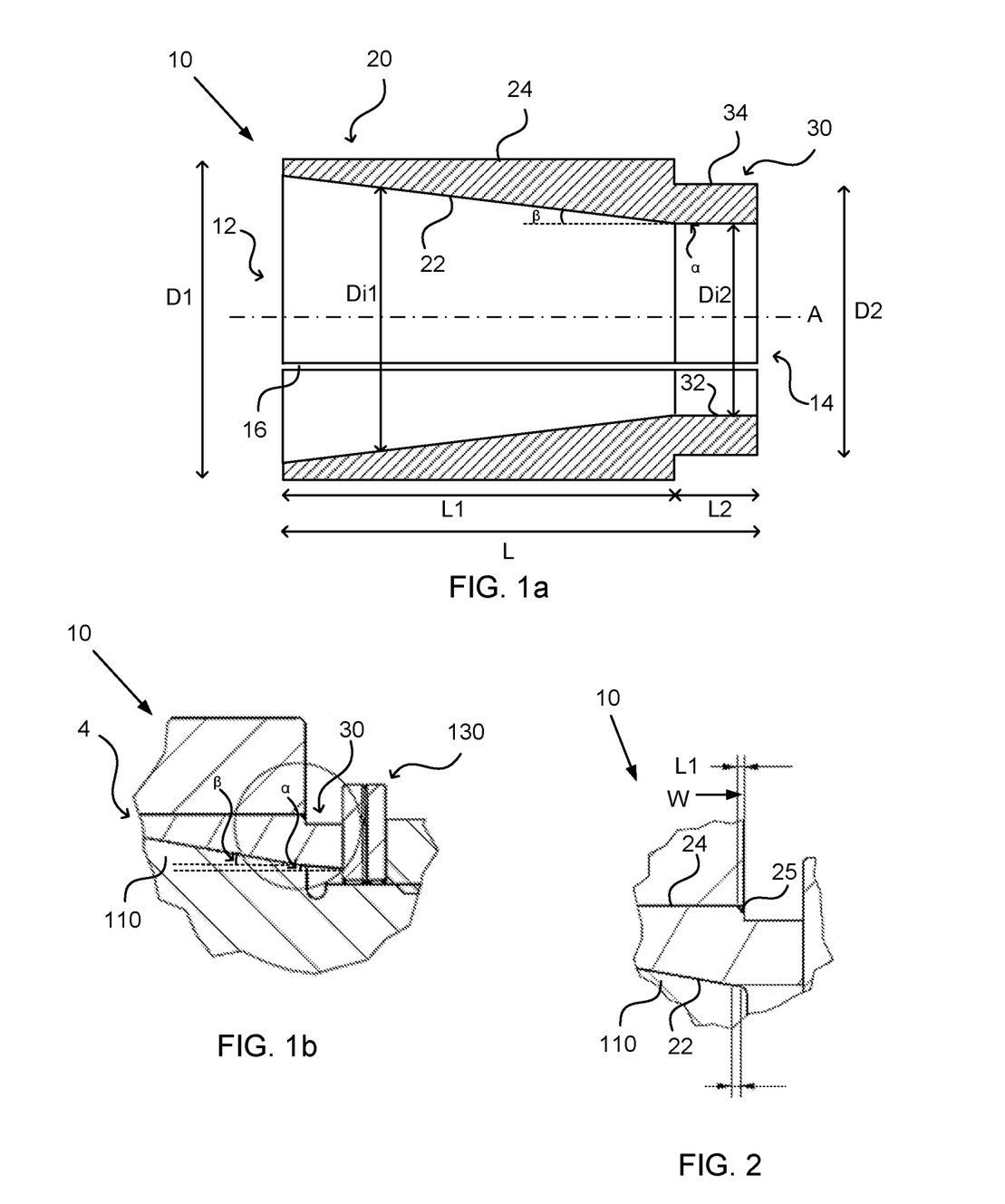
FIGS. 1a-b schematically illustrate an expansion sleeve according to an example.
FIG. 2 schematically illustrates an expansion sleeve according to an example.

FIGS. 1*a-b* schematically illustrates an expansion sleeve 10 according to examples of the present disclosure. The expansion sleeve 10 may be configured to be arranged on an axle 110 of a connection device 100 to secure the axle 110 in a hole 4. The connection device 100 is further described in FIG. 4*a-b*, FIG. 5*a-b* and FIG. 6*a-b*.

The expansion sleeve 10 comprises: a first section 20 with a first outer diameter D1; and a second section 30 with a second outer diameter D2, wherein the first section 20 has a conical shape with a tapering inner wall 22 configured to abut a tapered section of the axle, and an outer wall 24 configured to abut an inner wall of the hole 4. The second section 30 is configured to axially abut a fastening device arranged at an end of the axle. The second outer diameter D2 of the second section 30 is smaller than the first outer diameter D1 of the first section 20. The second section 30 comprises an inner wall 32 extending with an angle α relative the axial direction A of the expansion sleeve 10, which is smaller than the angle β of the tapering inner wall 22 of the first section 20. The second section 30 has an outer wall 34.

The axial direction A is the direction of the axial extension of the sleeve 10. The sleeve 10 may extend axially between a first end 12 at the first section 20 and a second end 14 at the second section 30. The axial extension of the sleeve 10 may be referred to as the length L of the sleeve 10. The length L1 of the first section 20 and the length L2 of the second section 30 in combination defines the total length L of the sleeve 10.

The sleeve 10 may comprise at least one cut/slot 16 enabling the expansion of the sleeve 10. The at least one cut/slot 16 may extend axially along the length L of the sleeve 10.

The first section 20 having a tapering inner wall 22 means that the first section 20 comprises a first inner diameter Di1, which varies along the length L1 of the first section 20. The tapering inner wall 22 of the first section 20 may be tapering in direction from the second section 30 towards the first end 12 of the sleeve 10. Thus, the first inner diameter Di1 of the first section 20 may increase in direction towards the first end 12 and decrease in direction towards the second section 30 of the sleeve 10.

According to an example, the second section 30 has a cylindrical shape. The second section 30 may thus have an essentially homogenous second outer diameter D2 and an essentially homogenous second inner diameter Di2. FIG. 1*a* illustrates this example, and the inner wall 32 of the second section 30 thus extends with an angle α of zero/180 degrees in relation to the axial direction A. The inner wall 32 and the outer wall 34 of the second section 30 thus extends in parallel with the axial direction A.

In another example, shown in FIG. 1*b*, the second section 30 has a conical shape. FIG. 1*b* shows the expansion sleeve 10 arranged on the axle 110 of the connection device 100, in a hole 4, with a fastening device 130 arranged to abut the second end 14 of the sleeve 10. In this example, the second section 30 comprises an inner wall 32, which extends with an angle α different from 0 or 180 degrees. The second section 30 may be conical, such that the second inner diameter Di2 decreases in direction towards the second end 14 of the sleeve 10.

FIG. 2 schematically illustrates an expansion sleeve 10 according to an example of the present disclosure. The expansion sleeve 10 may be configured as disclosed in FIGS. 1*a-b*. In this example, the outer wall 24 of the first section 20 has a length L1 similar to, or shorter than, a width W of the hole 4. The outer wall 24 of the first section 20 may have a chamfered section 25 in the transition between the first section 20 and the second section 30. FIG. 2 also shows an example where the tapering inner wall 22 of the first section 20 has a length similar to, or shorter than, a length of the tapered section of the axle 110.

Figure 3:
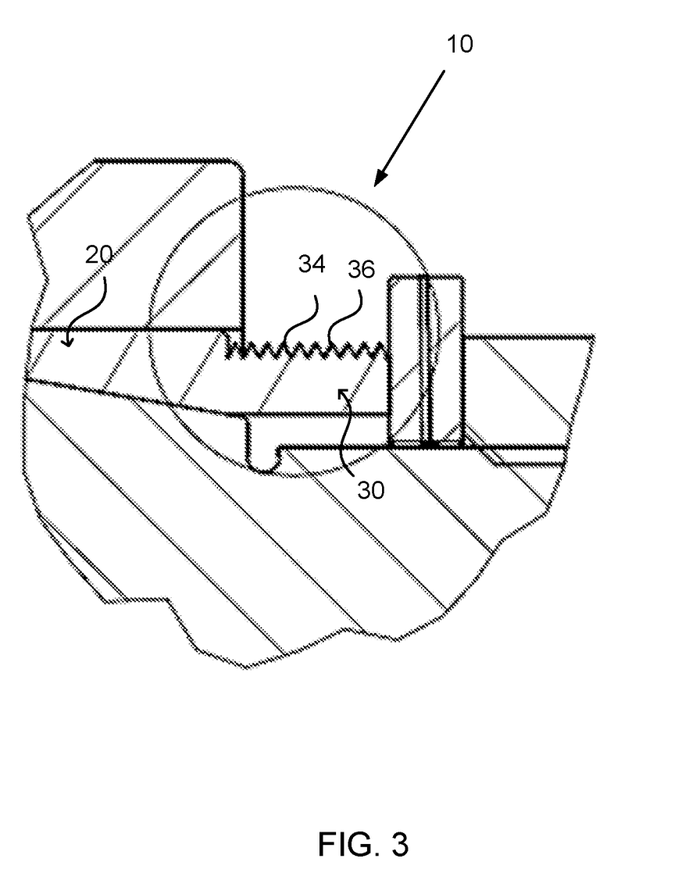
FIG. 3 schematically illustrates an expansion sleeve according to an example.

FIG. 3 schematically illustrates an expansion sleeve 10 according to an example of the present disclosure. The expansion sleeve 10 may be configured as disclosed in FIG. 1*a-b* or FIG. 2. In this example, the second section 30 comprises outer threads 36. Thus, the outer wall 34 of the second section 30 may comprise threads 36. The threads 36 may be used for removing the sleeve 10 from the connection device 100 and thereby facilitate removal of the sleeve 10.

Figure 4A:
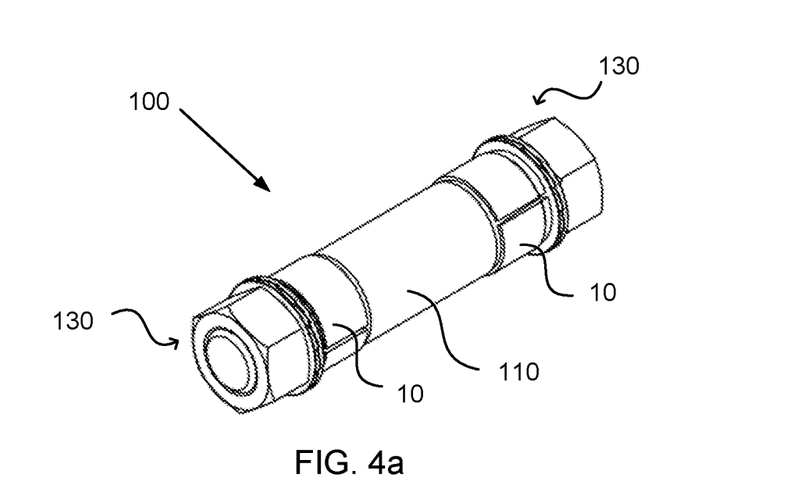
FIGS. 4a-b schematically illustrate a connection device according to an example.
Figure 4B:
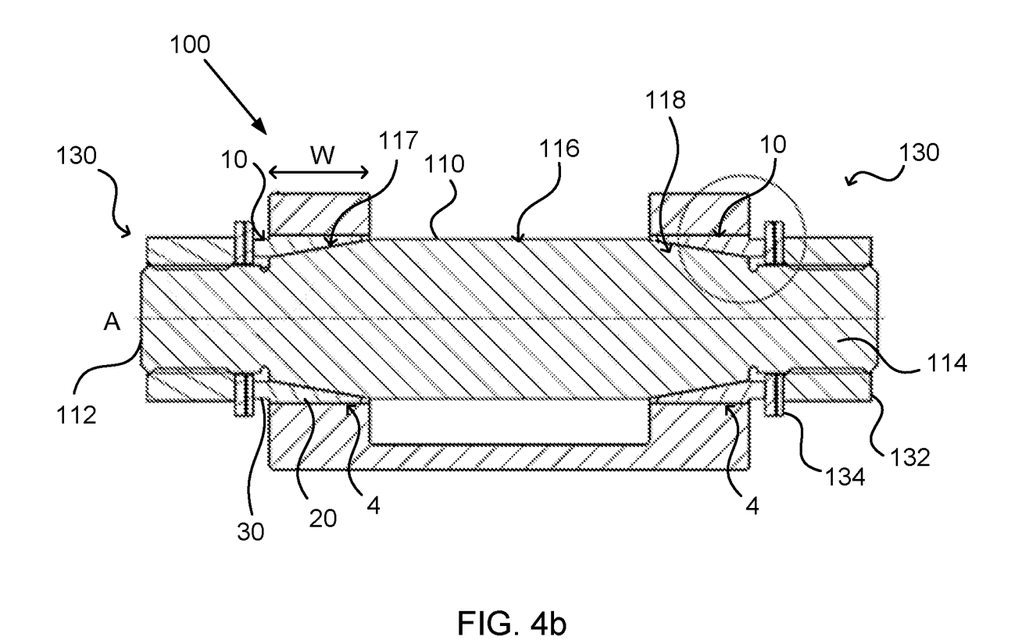

FIGS. 4*a-b* schematically illustrate a connection device 100 according to an example of the present disclosure. The connection device 100 may in this example be a pivot pin assembly 100. FIG. 4*a* illustrates a pivot pin assembly 100 for pivotally connecting two components (not shown). FIG. 4*b* shows a cross-sectional view of the pivot pin assembly 100 as disclosed in FIG. 4*a* arranged in a pair of pivot lugs. The pivot pin assembly 100 comprises an axle 110, at least one fastening device 130 arranged in connection with the axle 110, and at least one expansion sleeve 10 as disclosed in FIG. 1*a-b* or FIG. 2.

The axle 110 may comprise a first end section 112, a second end section 114, a centre section 116, a first tapered section 117 tapering from the centre section 116 towards the first end section 112, and a second tapered section 118 tapering from the centre section 116 towards the second end section 114. The axle 110 is configured to be arranged with the tapered sections 117, 118 in a pair of holes 4 as shown in FIG. 1*b*. The holes 4 are in this example holes in a pair of pivot lugs. In this example, the pivot pin assembly comprises two expansion sleeves 10, one arranged at each tapered section 117, 118 of the axle 110. The fastening devices 130 are arranged to press axially against the expansion sleeves 10, such that the expansion sleeves 10 expands and presses against the inner wall of the holes 4 and thus presses against the inner wall of the pivot lugs. The pair of pivot lugs and thus the holes 4 form part of one of the components to be pivotally connected to each other.

The sleeves 10 are coaxially arranged on the axle 110 with the first section 20 of the sleeve 10 aligned with the tapered section 117, 118 of the axle 110 and the hole 4, and the second section 30 aligned with an end section 112, 114 of the axle 110 outside the hole 4. The inner wall 32 of the second section 30 extending with a smaller angle α relative the axial direction A of the sleeve 10 than the angle β of the tapering inner wall 22 of the first section 20 means that there may be a gap between the second section 30 of the sleeve 10 and the axle 110. More specifically, there may be a gap between the second section 30 of the sleeve 10 and the end section 112, 114 of the axle 110.

The first end section 112 and the second end section 114 of the axle 110 may each have a diameter, which is smaller than the diameter of the tapered sections 117, 118 and the centre section 116 of the axle 110. The tapered sections 117, 118 of the axle 110, may have an axial extension similar to the width W of the holes 4. The length (axial extension) of the centre section 116 of the axle 110 may thus correspond to the distance between the two holes 4.

The fastening devices 130 may each comprise a nut 132 and/or a washer 134. The fastening devices 130 may each comprise only a nut 132, wherein the nut 132 is arranged surrounding an end section 112, 114 of the axle 110. The nuts 132 will in such case abut the second end 14 of the sleeves 10 and push the sleeves 10 axially over the tapered sections 117, 118 of the axle 110.

Alternatively, the fastening devices 130 may each comprise a nut 133 and a washer 134 as illustrated in this figure. The washer 134 and the nut 132 are then arranged surrounding an end section 112, 114 of the axle 110, such that the washers 134 abut the second end 14 of the sleeves 10. The nuts 132 will thereby be arranged outwardly of the washers 134.

Figure 5A:
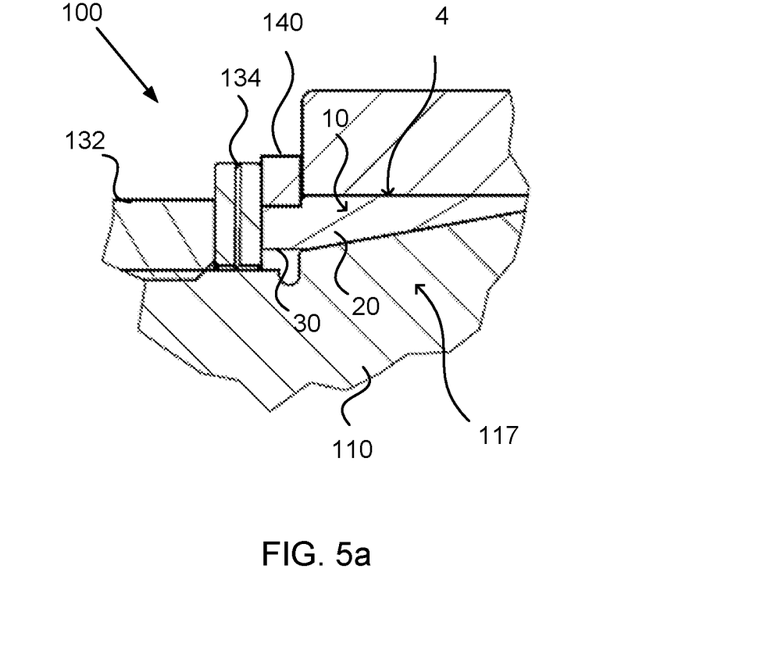
FIGS. 5a-b schematically illustrate a connection device according to an example.
Figure 5B:
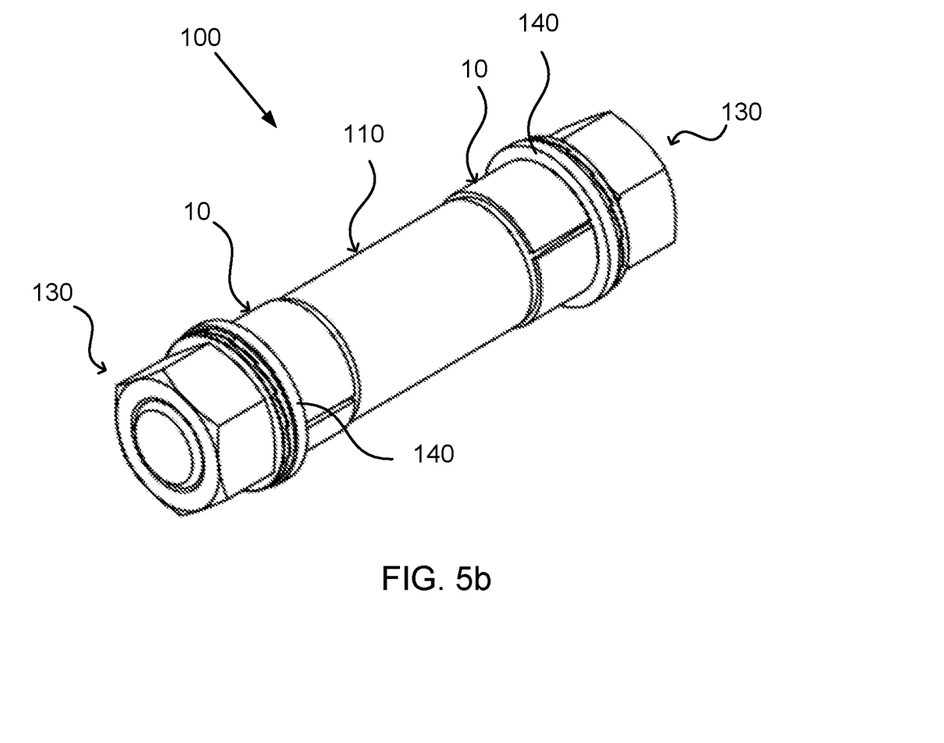

FIG. 5a-b schematically illustrate a connection device 100 according to an example of the present disclosure. The connection device 100 may be configured as disclosed in FIGS. 4a-b. In this example, the connection device/pivot pin assembly 100 further comprises at least one sealing 140 arranged at an end section 112, 114 of the axle 110. The sealing 140 is arranged around the second section 30 of a sleeve 10 and is thus clamped between a fastening device 130 and a component/part with a hole 4. The sealing 140 surrounds the second section 30 of the sleeve 10. The sealing 140 may be a commonly known sealing. The sealing 140 will prevent external dirt/contaminations/pollution from entering between the holes 4, the sleeves 10 and the axle 110. In FIG. 5b the connection device 100 is shown comprising two expansion sleeves 10 and two sealings 140, one sealing 140 arranged at each end section 112, 114 of the axle 110.

Figure 6A:
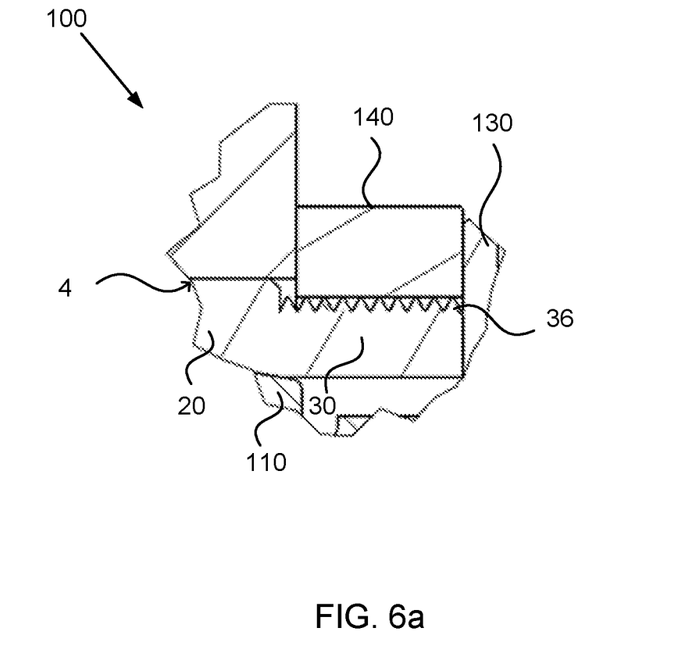
FIGS. 6a-b schematically illustrate a connection device according to an example.
Figure 6B:
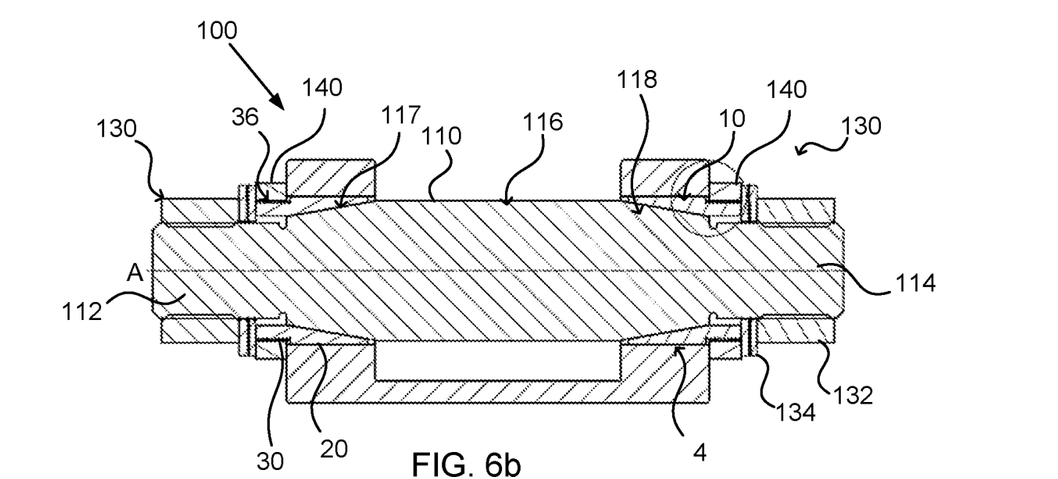

FIG. 6a-b schematically illustrate a connection device 100 according to an example of the present disclosure. The connection device 100 may be configured as disclosed in FIGS. 4a-b. In this example, the at least one expansion sleeve 10 is configured as disclosed in FIG. 3 and the second section 30 thus comprises outer threads 36. Furthermore, the connection device 100 further comprises at least one sealing 140 as also disclosed in FIGS. 5a-b. In FIG. 6b, the connection device 100 is shown comprising two expansion sleeves 10 and two sealings 140. Each sealing 140 is arranged around the second section 30 of a sleeve 10 and is thus clamped between a fastening device 130 and a component with a hole 4. The sealings 140 thus surrounds the outer threads 36 of the sleeves 10.

Figure 7:
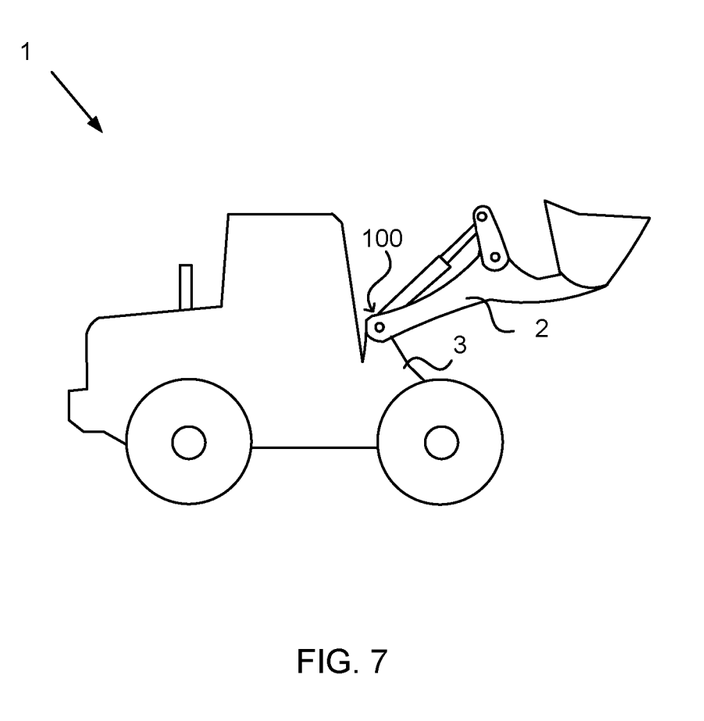
FIG. 7 schematically illustrates a vehicle according to an example.

FIG. 7 schematically illustrates a vehicle 1 according to an example of the present disclosure. The vehicle 1 may be a construction vehicle, a mining vehicle or a forestry vehicle. The vehicle 1 comprises a connection device 100 as disclosed in FIG. 4a-b, FIG. 5a-b or FIG. 6a-b. The vehicle 1 comprises two components 2, 3, which are connected by means of the connection device 100. One of the components 2, 3 comprises a hole 4 into which the connection device 100 is inserted. The other component 2, 3 may be connected to the centre section 116 of the axle 110 of the connection device 100.

The foregoing description of the examples of the present disclosure is provided for illustrative and descriptive purposes. It is not intended to be exhaustive or to restrict the disclosure to the variants described. Many modifications and variations will obviously be apparent to one skilled in the art. The examples have been chosen and described in order best to explain the principles of the disclosure and its practical applications and hence make it possible for specialists to understand the disclosure for various examples and with the various modifications appropriate to the intended use.

The invention claimed is:

1. A connection device for pivotably connecting two components, the connection device comprising:
   an axle;
   at least one fastening device arranged in connection with the axle;
   a seal ring; and
   at least one expansion sleeve, the expansion sleeve comprising:
   a first section with a first outer diameter; and
   a second section with a second outer diameter,
   wherein the first section has a conical shape with a tapering inner wall configured to abut a tapered section of the axle, and an outer wall configured to abut an inner wall of a hole defined by a pivot lug of one of the components, the second section being configured to axially abut a fastening device arranged at an end of the axle,
   wherein the second outer diameter of the second section is smaller than the first outer diameter of the first section,
   wherein the second section comprises an inner wall extending with an angle relative the axial direction of the expansion sleeve which is smaller than the angle of the tapering inner wall of the first section;
   wherein the axle comprises at least one tapered section and is configured to be arranged with the at least one tapered section in the hole,
   wherein the at least one expansion sleeve is arranged over the tapered section, the at least one fastening device engaging the second section of the expansion sleeve and pressing axially against the expansion sleeve, such that the first section of the expansion sleeve expands and the outer wall of the first section presses against the inner wall of the hole,
   wherein the seal ring is arranged around the second section of the expansion sleeve; and
   wherein the seal ring is arranged between the fastening device and a shoulder of the expansion sleeve between the first and second sections to seal against a surface of the pivot lug and prevent contaminants from entering the hole.

2. The connection device according to claim 1, wherein the axle comprises a first end section and a second end section and the connection device comprises two fastening devices, one arranged over each end section of the axle, wherein the axle further comprises a centre section, a first tapered section tapering from the centre section towards the first end section, and a second tapered section tapering from the centre section towards the second end section.

3. The connection device according to claim 1, wherein the at least one fastening device comprises a nut and/or a washer.

4. The connection device according to claim 1, wherein the seal ring has a thickness corresponding to the length of the second section of the expansion sleeve.

5. A vehicle, comprising a connection device to pivotably connect two components of the vehicle, the connection device comprising:
   an axle;
   at least one fastening device arranged in connection with the axle;
   a gasket; and
   at least one expansion sleeve, the expansion sleeve comprising:
   a first section with a first outer diameter; and
   a second section with a second outer diameter;
   wherein the first section has a conical shape with a tapering inner wall configured to abut a tapered section of the axle, and an outer wall configured to abut an inner wall of a hole defined by a pivot lug of one of the components, the second section being configured to axially abut a fastening device arranged at an end of the axle, wherein the second outer diameter of the second section is smaller than the first outer diameter of the first section, and wherein the second section comprises an inner wall extending with an angle relative the axial direction of the expansion sleeve which is smaller than the angle of the tapering inner wall of the first section;
   wherein the axle comprises at least one tapered section and is configured to be arranged with the at least one tapered section in the hole, wherein the at least one expansion sleeve is arranged over the tapered section, the at least one fastening device engaging the second section of the expansion sleeve and pressing axially against the expansion sleeve, such that the first section of the expansion sleeve expands and the outer wall of the first section presses against the inner wall of the hole;
   wherein the gasket is arranged around the second section of the expansion sleeve; and
   wherein the gasket is arranged between the fastening device and a shoulder of the expansion sleeve between the first and second sections to seal the gasket against a surface of the pivot lug and prevent contaminants from entering the hole.

6. The vehicle of claim 5, wherein the outer wall of the first section has a chamfered section in a transition between the first section and the second section.

7. The vehicle of claim 5, further comprising at least one cut extending axially along a length of the expansion sleeve to enable expansion of the expansion sleeve.

8. The vehicle of claim 7, wherein the at least one cut extends along both the first section and the second section.

9. The vehicle of claim 5, wherein the second section has a cylindrical shape.

10. The vehicle of claim 5, wherein the second section has a conical shape.

11. The vehicle of claim 5, wherein the second section comprises outer threads.

12. An expansion sleeve of a connection device for pivotably connecting two components, the expansion sleeve being arranged on an axle of the connection device to secure the axle in a hole of a pivot lug of one of the components, the expansion sleeve comprising:
   a first section with a first outer diameter;
   a second section with a second outer diameter; and
   a seal ring arranged around the second section of the expansion sleeve;
   wherein the first section has a conical shape with a tapering inner wall configured to abut a tapered section of the axle, and an outer wall configured to abut an inner wall of the hole, the second section being configured to axially abut a fastening device arranged at an end of the axle,
   wherein the second outer diameter of the second section is smaller than the first outer diameter of the first section,
   wherein the second section comprises an inner wall extending with an angle relative the axial direction of the expansion sleeve, which is smaller than the angle of the tapering inner wall of the first section,
   wherein the expansion sleeve is arranged over the tapered section, a fastening device engaging the second section of the expansion sleeve and pressing axially against the expansion sleeve, such that the first section of the expansion sleeve expands and the outer wall of the first section presses against the inner wall of the hole, and
   wherein the seal ring is arranged between the fastening device and a shoulder of the expansion sleeve between the first and second sections to seal against a surface of the pivot lug and prevent contaminants from entering the hole.

13. The expansion sleeve of claim 12, wherein the outer wall of the first section has a chamfered section in a transition between the first section and the second section.

14. The expansion sleeve of claim 12, further comprising at least one cut extending axially along a length of the expansion sleeve to enable expansion of the expansion sleeve.

15. The expansion sleeve of claim 14, wherein the at least one cut extends along both the first section and the second section.

16. The expansion sleeve of claim 12, wherein the second section has a cylindrical shape.

17. The expansion sleeve of claim 12, wherein the second section has a conical shape.

18. The expansion sleeve of claim 12, wherein the second section comprises outer threads.

* * * * *